United States Patent
Kaulbach et al.

(10) Patent No.: US 6,713,141 B2
(45) Date of Patent: Mar. 30, 2004

(54) MIXTURES OF THERMOPLASTIC FLUOROPOLYMERS

(75) Inventors: Ralph Kaulbach, Burgkirchen (DE); Friedrich Kloos, Kastl (DE); Gernot Löhr, Burgkirchen (DE); Peter Stamprech, deceased, late of Anif (AT), by Lieselotte Stamprech, legal representative

(73) Assignee: 3M Innovative Properties Companyz, St. Paul, MN (US)

( * ) Notice: Subject to any disclaimer, the term of this patent is extended or adjusted under 35 U.S.C. 154(b) by 0 days.

(21) Appl. No.: 09/908,531

(22) Filed: Jul. 17, 2001

(65) Prior Publication Data

US 2002/0010277 A1 Jan. 24, 2002

Related U.S. Application Data

(63) Continuation of application No. 09/058,537, filed on Apr. 10, 1998.

(30) Foreign Application Priority Data

Feb. 13, 1998 (DE) .......................... 198 05 832

(51) Int. Cl.$^7$ .......................... B29D 22/00; B29D 23/00; C08L 27/12
(52) U.S. Cl. .................. 428/36.9; 525/200; 526/242; 526/247
(58) Field of Search .................. 525/200; 526/242, 526/247; 428/369

(56) References Cited

U.S. PATENT DOCUMENTS

| | | | |
|---|---|---|---|
| 3,635,926 A | 1/1972 | Gresham et al. | 260/87.5 |
| 3,642,742 A | 2/1972 | Carlson | 260/87.5 |
| 4,029,868 A | 6/1977 | Carlson | 526/247 |
| 4,262,101 A | 4/1981 | Hartwimmer et al. | 526/89 |
| 4,552,925 A * | 11/1985 | Nakagawa et al. | 525/200 |
| 4,743,658 A | 5/1988 | Imbalzano et al. | 525/326.4 |

FOREIGN PATENT DOCUMENTS

| | | | |
|---|---|---|---|
| DE | C 1901872 | 1/1969 | C08F/27/02 |
| DE | A 19547909 | 6/1997 | C08L/27/18 |
| EP | 0 088 414 | 9/1983 | C08F/214/18 |
| EP | A 0 150 953 | 1/1984 | C08F/8/50 |
| EP | B 0 362 868 | 10/1989 | C08L/27/18 |
| GB | A 1 210 794 | 10/1970 | C08F/27/02 |
| WO | WO-A 97/07147 | 2/1997 | C08F/214/26 |

OTHER PUBLICATIONS

Pozzoli refers to Pozzoli et al., "Melt–processable Perfluoropolymers", Modern Fluoropolymers, ed., Scheirs, John Wiley & Son New York, pp 373–396 (1997).*
Encyclopedia of Polymer Science, 2$^{nd}$ Edition, John Wiley & Sons, vol. 6, p. 477, 1986.
Encyclopedia of Polymer Science, 2$^{nd}$ Edition, John Wiley & Sons, vol. 14, p. 466–7, 1988.
"Modern Fluoropolymers", John Wiley & Sons, 1997, K. Hintzer, G. Löhr, *Melt Processable Tetrafluoroethylene–Perfluoropropylvinyl Ether Copolymers (PFA)* p. 223–237.
Deutscher Verband für Schweisstechnik [German Association for Welding Technology] DVS 2203, part 4 (Translation attached).

* cited by examiner

Primary Examiner—Donald R. Wilson
(74) Attorney, Agent, or Firm—James V. Lilly; Dean M. Harts

(57) ABSTRACT

A low-molecular-weight copolymer of tetrafluoroethylene with units of perfluoro alkyl vinyl ethers having a melt index of ≧30 suitable as a mixing component with a higher-molecular-weight copolymer of the same monomers for producing moldings in injection molding or by extrusion.

4 Claims, No Drawings

MIXTURES OF THERMOPLASTIC FLUOROPOLYMERS

This is a continuation of application Ser. No. 09/058,537 filed Apr. 10, 1998, now pending, which claims priority from German Patent Application No. 198 05 832.2, filed Feb. 13, 1998.

DESCRIPTION

1. Field of the Invention

This invention relates to thermoplastic polymers having tetrafluoroethylene units and perfluoro alkyl vinyl ether units, mixtures of such polymers that contain low molecular weight and high molecular weight components, and to processes and articles that employ such polymers.

2. Background

Copolymers of tetrafluoroethylene (TFEs below) and perfluoro alkyl vinyl ethers having from 1 to 4 carbon atoms in the alkyl moiety (PAVEs below), in particular perfluoro n-propyl vinyl ether (PPVEs below) have been known for a long time. Such copolymers are commercially available under the designation "PFA". At a PAVE copolymer content of about 2% by weight and greater, these partially crystalline copolymers have excellent technical performance, for example exceptional chemical stability, combined with high service temperatures. They can be processed from the melt as thermoplastics, for example by compression molding, extruding or injection molding. Preferred applications are, inter alia, extruded pipes, tubes and cable sheathing. Processing from the melt takes place at temperatures of from 350 up to 450° C. Under these conditions, both thermal and mechanical degradation occur.

The thermal degradation takes place predominantly via the thermally unstable end groups formed in the polymerization, i.e. from the end of the chain. The mechanism of this degradation is described in more detail in "Modern Fluoropolymers", John Wiley & Sons, 1997, K. Hintzer and G. Löhr, Melt Processable Tetrafluoroethylene-Perfluoropropylvinyl Ether Copolymers (PFA), page 223. The degradation can be substantially suppressed by converting the thermally unstable end groups into stable $CF_3$ end groups by postfluorination, as described, for example in U.S. Pat. No. 4,743,658 and DE-C-19 01 872.

Corrosive gases arise during the thermal degradation, and these considerably impair the quality of the final product by metal contamination or bubble formation, and can corrode tooling and processing machinery, The effect naturally increases with falling molecular weight (lower melt viscosity).

The mechanical degradation during processing takes place through chain breakage, recognizable by the increase of the melt flow index (MFI). It increases as extrusion speed (shear rate) rises. The resultant lowering of molecular weight considerably worsens the mechanical properties, in particular the flexural fatigue strength and other long-term properties, such as long-term failure (stress crack resistance). Keeping the mechanical degradation within acceptable limits places corresponding limitations on processing conditions. This applies in particular to the extrusion speed for pipes, tubes and cable sheathing. At higher extrusion speeds, melt fracture (shark skin) also occurs, as with all thermoplastics. Although it is possible to implement higher extrusion speeds without melt fracture by lowering the molecular weight (higher MFI values), such products do not have adequate mechanical properties. For this reason, PFA products with an MFI value >15 are currently not on the market.

It is known from WO-A-97/07147 that a marked rise in the extrusion rate is possible, while avoiding melt fracture and with retention of the mechanical properties, with partially crystalline copolymers which consist essentially of TFE and at least 3% by weight of perfluoro ethyl vinyl ether and which have a melt viscosity of not more than $25 \times 10^3$ Pas at 372° C., with the proviso that the melt viscosity may exceed this value if the content of the ether mentioned exceeds 10% by weight. The perfluoro ethyl vinyl ether is, however, difficult to obtain, and therefore all of the marketed products contain PPVE, which is easily obtainable industrially and is also preferred for the present invention.

DISCLOSURE OF THE INVENTION

A PFA has now been found which has good melt processability and which contains at least one high-molecular-weight PFA with an MFI≦15, preferably from 0.01 to 15, and at least one low-molecular-weight PFA with MFI≧30. The mixtures of the invention are particularly useful in applications where chemical resistance and high temperature resistance are important.

The invention therefore relates to mixtures of thermoplastic fluoropolymers essentially comprising units of TFE and subordinate amounts of units of one or more PAVEs having from 1 to 4 carbon atoms in the alkyl moiety and a total concentration of from 0.5 to 10 mol %, the mixture comprising A) at least one low molecular weight component with an $MFI_A \geqq 30$ and B) at least one high molecular weight component with an $MFI_B \leqq 15$. These components are selected in such a way that the ratio of the $MFI_A$ of component A) to the $MFI_B$ of component B) is in the range from 80 to 2500, preferably in the range of from 240 to 750.

"Essentially comprising units of TFE and of a PAVE" means that small amounts, up to about 5 mol %, of other fluoromonomers not containing hydrogen, such as hexafluoropropene or chlorotrifluoroethylene, are not to be excluded. The composition of the copolymer of the two components may differ within the limits mentioned above.

The mixing ratio of high- and low-molecular-weight components may vary within wide limits and can be determined for the desired application by means of simple preliminary experiments. The ratio is generally from 10:90 to 90:10, preferably in the range from 25:75 to 75:25 parts by weight and in particular from 60:40 to 40:60 parts by weight.

The invention also relates to a novel low-molecular-weight PFA with an MFI≧30, preferably ≧120 with preference from 120 to 1000, in particular from 120 to 700, especially from 200 to 600.

Another aspect of the invention relates to mixtures of the novel low-molecular-weight PFA(s) mentioned with the high-molecular-weight PFA(s) mentioned above, the MFI ratio mentioned above corresponding approximately to a molecular weight ratio of the high-molecular-weight to the low-molecular-weight component(s) ≧3.5, preferably from 3.5 to 10, in particular from 3.5 to 7.

The MFI gives the amount of a melt in grams per 10 min which is extruded from a holding cylinder through a die by the action of a piston loaded with weights. The dimensions of the die, the piston, the holding cylinder and the weights are standardized (DIN 53735, ASTM D-1238). All of the MFIs mentioned here have been measured with a die of diameter 2.1 mm and length 8 mm using a superimposed weight of 5 kg and a temperature of 372° C. The values 0.01 and 1000 are practically the limiting values of this measurement method.

For very high MFI values, therefore, it is expedient to reduce the superimposed weight to values down to 0.5 kg, and for very small MFI values to increase it to values up to 20 kg. The MFI values determined in this way are recalculated for a superimposed weight of 5 kg.

The present invention further provides a process for making a shaped article from the mixtures of the invention. This process involves providing the mixture, extruding, compression molding, or injection molding the mixture, and preferably, cooling the mixture to provide a self-supporting shaped article.

Still further the present invention provides shaped articles comprising the mixture. Examples of such articles include molded or extruded goods such as films, pellets, wire and cable insulation, tubes and pipes, containers, vessel liners, and the like.

DETAILED DESCRIPTION

The novel mixtures may be prepared in a conventional manner, i.e. for example by mixing the pulverulent products, mixing dispersions of the components, or by conducting the polymerization in an appropriate manner ("step polymerization") with controlled use of initiator and chain transfer agent, such as short-chain alkanes and haloalkanes, and also hydrogen. An advantageous procedure here is as follows: at the start of the polymerization, for a low desired MFI, relatively little initiator and relatively little chain transfer agent are metered in. These polymerization conditions are changed at the desired juncture in the polymerization, depending on the type of composition by weight to be achieved, for example after 50% of the TFE addition, by metering in further initiator and chain transfer agent, so that the polymer produced as the polymerization continues has the desired high MFI. The desired high MFI may also be created by increasing the temperature during the polymerization. The advantage of this preparation process is that a "perfect" mixture of the two components is created in situ.

Preference is given to mixing dispersions of the components and working up the mixture in a manner known per se (U.S. Pat. No. 4,262,101) or advantageously by mechanical precipitation using a homogenizer, followed by agglomeration by petroleum fractions. After subsequent drying, the product is subjected to melt granulation.

Because the two components have very different MFI values, homogeneous mixtures of powders or of melt granules down to the micro range can be produced only with equipment which is relatively highly elaborate. However, homogeneous mixtures are essential for achieving excellent performance.

Compared with a PFA having comparable MFI, the novel mixtures are distinguished by considerably increased extrusion speed without melt fracture. However, as shown by MFI determination before and after processing, this is not at the cost of significantly increased degradation.

The novel mixtures have a noticeably increased zero-shear viscosity and a lower complex viscosity at higher shear rates, compared with a commercially available polymer component with identical MFI.

The PFA with MFI$\geq$30 differs from the hitherto conventional grades of PFA in its low molecular weight. It therefore has a relatively large number of labile end groups, which limit the thermal stability of the material. For relatively stringent requirements therefore it is expedient to convert the unstable end groups to stable end groups in a manner known per se by reaction with elemental fluorine (GB A 1 210 794, EP-A-0 150 953 and U.S. Pat. No. 4,743,658). It is expedient here to dilute the fluorine with an inert gas and to use this mixture to treat the dry polymer or polymer mixture. The toxic fluorine is then removed by flushing with inert gas. This same process may be used to post fluorinate the mixtures of the invention.

The success of the postfluorination is checked by IR-spectroscopic determination of the residual carboxyl and/or carbonyl fluoride end groups, as described in U.S. Pat. No. 4,743,658. However, complete fluorination of the end groups is not necessary. Reduction of the thermally unstable end groups (COOH+COF) to from 10 to 15 end groups/$10^6$ carbon atoms is sufficient to achieve the desired improvements in properties. This significantly shortens the reaction time and therefore makes the postfluorination more cost-effective.

The novel PFA mixture postfluorinated in this way shows no discoloration, even at 450° C. It therefore permits higher processing temperatures and thus a rise in the throughputs in the extrusion of tubes and of sheathing for wires and cables, and also in injection molding. A further advantage of the increased high-temperature resistance is that when production failures occur, the novel PFA mixture remains for a longer residence time at high temperatures without degradation and thus there is no discoloration or bubble formation at elevated temperature and no corrosion of the processing machinery or of the substrates which come into contact with the polymer mixture.

The preferred process for preparing the novel mixtures consists in blending the two components as dispersions, agglomerating these, drying and melt granulation followed by water-treatment (DE-A-195 47 909) of the granules obtained from the melt and, if desired, postfluorination of the same.

The novel mixtures are advantageously suitable for producing thin-walled articles by extrusion or extrusion blow molding and injection molding. The higher processing speeds which are possible here do not have to be obtained at the cost of impairment of properties; on the contrary, the products obtained surprisingly have increased stiffness (increased modulus of elasticity) and yield stress, i.e. the novel mixtures can resist higher mechanical stresses in particular applications, since an increased yield stress means an enlargement of the elastic range of these materials. This makes it possible to create moldings with longer service lives, and this in turn permits the use of tubes with thinner walls.

The polymerization may be carried out by known processes of aqueous free-radical emulsion polymerization (U.S. Pat. No. 3,635,926, U.S. Pat. No. 4,262,101), or in a non-aqueous phase (U.S. Pat. No. 3,642,742).

The perfluoro propyl vinyl ether content is determined by IR spectroscopy (U.S. Pat. No. 4,029,868).

EP-B-362 868 has already disclosed mixtures of fluoropolymers, including investigation of high-molecular-weight and low-molecular-weight PFA grades. The low-molecular-weight component here is defined by a melt viscosity at 380° C. of from 5000 to 280,000 Poise, corresponding to an MFI at 372° C. of from 80 to 1.6. It is expressly mentioned here that a melt viscosity of less than 5000 Poise (MFI>80) leads to poor mechanical properties of the mixture. In the mixture described as example in EP-B-362 868, column 4, the mean molecular weights of the PFA grades used differ only slightly, to be specific approximately only by a factor of 1.5, corresponding to the melt viscosities of $8.1\times10^4$ and $1.9\times10^4$ Poise, respectively. Such materials are particularly suitable for thick-walled extruded articles, such as pipes.

The invention is described in more detail in the following examples. Percentage and ratio data are based on weight unless otherwise stated. Degradation behavior is assessed using the ratio of MFI after and before processing.

EXAMPLE 1

25 l of demineralized water and 122 g of ammonium perfluorooctanoate in the form of a 30% strength solution are placed in a polymerization reactor having a total volume of 40 l and provided with an impeller stirrer. After the reactor has been sealed, atmospheric oxygen is removed by alternate evacuation and flushing with nitrogen, and the vessel is heated to 60° C. 46 g of methylene chloride and 0.180 kg of PPVE are pumped in. The stirrer is set at 240 rpm. TFE is then introduced until the total pressure has reached 13.0 bar. The polymerization is initiated by pumping in 6.6 g of ammonium persulfate (APS below), dissolved in 100 ml of demineralized water. As soon as the pressure begins to fall, further TFE and PPVE are supplemented via the gas phase in accordance with the target ratio of PPVE (kg)/TFE (kg) of 0.042, in such a way that the total pressure of 13.0 bar is maintained. The heat liberated is dissipated by cooling the vessel wall, and in this way the temperature of 60° C. is held constant. After a total of 7.2 kg of TFE has been fed into the reactor, the monomer feed is interrupted, the pressure in the reactor is released and the reactor is flushed several times with $N_2$.

The resultant amount of 31.5 kg of polymer dispersion with a solids content of 22.8% is discharged from the bottom of the reactor. After the dispersion has been transferred into a 180 l stirring vessel, its volume is increased to 100 l with demineralized water and it is mixed with 200 ml of concentrated hydrochloric acid and stirred until the solid has separated from the aqueous phase. The flocculant powder precipitated after stirring is granulated with 6.9 l of a petroleum fraction, the petroleum fraction is driven off using steam, and the granules are then washed six times by vigorous and thorough stirring with 100 l of demineralized water on each occasion. The moist powder is dried for 12 hours at 260° C. in a drying cabinet under nitrogen. This gives 7.1 kg of a low molecular weight bipolymer according to the invention which has a PPVE content of 3.9% and an MFI of 40.

EXAMPLE 2

A PFA mixture according to the invention having an MFI of 2.3 is prepared from a 50/50 mixture composed of a dispersion of the material from Example 1 and a dispersion of a PFA having an MFI of 0.5. The ratio of $MFI_A$ to $MFI_B$ is 80.

In preparing the PFA having an MFI of 0.5, the procedure is as in Example 1, but 6.7 g of methylene chloride and 1.8 g of APS are pumped in, giving a bipolymer which has 3.9% of PPVE and an MFI of 0.5.

The dispersion mixture is worked up as in Example 1. This gives a bipolymer which has a PPVE content of 3.9% and an MFI of 2.3. After melt granulation, the MFI rises to 2.4.

EXAMPLE 3

The PFA mixture of Example 2 is compared with a commercially available PFA having an MFI of 2 in the extrusion of a tube having an external diameter of 28.3 mm and an internal diameter of 27.7 mm.

| Extruder data: | |
|---|---|
| Diameter: | 50 mm |
| Length: | 1200 mm (length: diameter ratio = 24) |
| Compression ratio: | 2.5:1 |
| Die: | |
| Outer annulus diameter: | 60 mm |
| Inner annulus diameter: | 55 mm |
| Parallel portion: | 25 mm |
| Calibration: | |
| Diameter: | 28.4 mm |
| Extrusion speed: | |
| Standard setting: | 2.3 m/min at 22 rpm |
| Throughput: | 8 kg/h |
| Tube weight: | 60 g/m |
| Temperature control: | |
| Barrel 1 (Feed): | 340° C. |
| Barrel 2: | 355° C. |
| Barrel 3: | 370° C. |
| Barrel 4: | 375° C. |
| Flange: | 310° C. |
| Head: | 376° C. |
| Die: | 388° C. |

The results are shown in the following table, the meanings of abbreviations being PFA2: Commercially available product with an MFI of 2

TS: Ultimate tensile strength $N/mm^2$

EB: Elongation at break %

Y: Yield stress $N/mm^2$ (in each case in accordance with DIN 53455/ASTM D 1708, measured in longitudinal and transverse direction on tes specimens stamped out from the tube).

| | Throughput | MFI | MFI | | Mechanical properties | | | | |
|---|---|---|---|---|---|---|---|---|---|
| | | | | | Longitudinal | | | Transverse | | |
| Material | (kg/h) | before | after | Rise | TS | EB | Y | TS | EB | Y |
| PFA2 | 8 | 2 | 2.7 | 1.35 | 26 | 300 | 12 | 32 | 350 | 12 |
| PFA2 | 13.5*) | 2 | 2.7 | 1.45 | 28 | 320 | 12 | 30 | 340 | 12 |
| Example 2 | 8 | 2.4 | 2.8 | 1.17 | 28 | 340 | 13 | 29 | 360 | 13 |
| Example 2 | 20*) | 2.4 | 3.3 | 1.38 | 27 | 320 | 13 | 30 | 390 | 13 |

*)highest throughput possible without melt fracture

Therefore whereas the commercially available product PFA2 permits only a maximum throughput of 13.5 kg/h, the mixture of Example 2 allows a throughput of 20 kg/h, without adverse effects on the quality of the tube. The MFI change shows that the commercially available product, even at a low throughput of 8 kg/h, is degraded to about the same extent as the novel material from Example 2 at a throughput of 20 kg/h.

The yield stress of the novel material is increased. This means that the final article has a higher dimensional stability and/or stiffness.

The tubes extruded with the mixture of Example 2 prepared according to the invention also show, compared with the commercially available PFA2 material, increased cold bursting strength.

Using the mixture of Example 2 prepared according to the invention and the commercially available PFA2 material, and under the same conditions, pipes of 1 mm wall thickness and 10 mm diameter were extruded and their cold bursting strength determined.

The test took place on a bursting strength test apparatus (in-house construction), in which a firmly secured plastic pipe was filled with water and placed under pressure using a pneumatic pump. The pressure test is regarded as having been passed if the pipe survives without damage after pressure has been maintained for 6 min at a test pressure dependent on the dimensions of the pipe. After this test has been carried out, the test pressure is raised by 2 bar/min until the pipe bursts, in order to determine the residual bursting strength.

The specified test pressure for pipes of this size is 22 bar.

| Materials | Pressure test | Residual bursting strength [bar] |
|---|---|---|
| Example 2 | Passed | 27 |
| PFA2 | Some passes Some buckling | 24 |

EXAMPLE 4

The PFA mixture of Example 2 is processed to give a pressed sheet, and long-term failure is determined on specimens of this pressed sheet. The PFA2 defined in Example 3 served as comparison. Whereas the mean value of the times to failure for PFA2 is 194 h, after 793 h only two of three specimens of the mixture of Example 2 had failed.

The tests were long-term tensile creep tests based on the specification of the Deutscher Verband für Schweisstechnik [German Association for Welding Technology], DVS 2203, Part 4, on notched specimens. The specimens were compression-molded plates of 5 mm thickness. The force applied was 4 N/mm$^2$. The medium used is demineralized water containing 2% of non-ionic surfactant (ARKOPAL® N 100). The tests are carried out at a temperature of 80° C. In each case, the measurements are carried out on three identical test specimens. This test method, and therefore also the results, permit correlation with DIN 8075 measurements of the effects of long-term internal hydrostatic pressure on pipes.

| Material | Time to fracture (mean calculated from three values) |
|---|---|
| PFA 2 | 194 h |
| Example 2 | >793 h |

EXAMPLE 5

The procedure of Example 1 is followed, but 200 g of methylene chloride and 20 g of APS are pumped in, resulting in a low molecular weight bipolymer according to the invention having a PPVE content of 4% and an MFI of 500.

EXAMPLE 6

A PFA mixture according to the invention having an MFI of 9.8 is prepared as agglomerate from a 50/50 mixture composed of a dispersion of the material from Example 5 and a dispersion of a PFA with an MFI of 1.6. The ratio of $MFI_A$ to $MFI_B$ is 312.5.

In preparing the PFA with the MFI of 1.6, the procedure is as in Example 1, but 19 g of methylene chloride and 2 g of APS are pumped in, giving a bipolymer which has 4.2% of PPVE and an MFI of 1.6.

The dispersion mixture is worked up as in Example 1. This gives a bipolymer which has a PPVE content of 4.1 mol % and an MFI of 9.8.

EXAMPLE 7

The PFA mixture of Example 6 (MFI 9.8) is compared with commercially available products in pellet form having an MFI of 10 (for example PFA10) in the injection molding of specimens. For this the materials are firstly converted into melt pellets, the MFI changing as shown in the table.

| Dumbbell specimens: | |
|---|---|
| Heating: | |
| Temperature in Zone 1: | 390° C. |
| Temperature in Zone 2: | 390° C. |
| Temperature in Zone 3: | 420° C. |
| Temperature in Zone 4: | 350° C. |
| Injection pressure: | 600 bar (6·10$^7$ Pa) |
| Injection rate: | 4 mm/s |
| Mold temperature: | 210° C. |

Results:

| Material | MFI pellets | MFI in specimen | Modulus of elasticity [N/mm$^2$] | Yield stress [N/mm$^2$] | EB [%] | TS [N/mm$^2$] | Degradation |
|---|---|---|---|---|---|---|---|
| Example 6 | 11.5 | 13.2 | 642 | 15.5 | 468 | 23.5 | 1.15 |
| PFA10 | 10 | 11.7 | 593 | 14.8 | 450 | 27.0 | 1.2 |

Modulus of elasticity and yield stress are measured on dumbbell specimens (DIN 53455, Test specimen No. 3) by the DIN 53457 measurement method. The novel material shows lower degradation, higher modulus of elasticity and higher yield stress, without change in mechanical properties, such as TS and EB.

The improved flowability of the novel mixture is also apparent in the injection molding of spirals. The greater the length of the injected spiral, the better the flow performance. The degradation occurring in this procedure can be assessed from the MFI ratio.

| The injection conditions are as follows: | | |
|---|---|---|
| Heating | Program 1 | Program 2 |
| Temperature in Zone 1 | 435° C. | (390° C.) |
| Temperature in Zone 2 | 435° C. | (390° C.) |
| Temperature in Zone 3: | 420° C. | (380° C.) |
| Temperature in Zone 4: | 350° C. | (350° C.) |
| Injection pressure: | 600 bar | 700 bar |

| Results: | | | |
|---|---|---|---|
| Material | Heating program | Length | Degradation $MFI_{spiral}/MFI_{starting\ material}$ |
| Example 6 | 1 | 26.1 | 2.5 |
| PFA10 | 1 | 22.9 | 2.45 |
| Example 6 | 2 | 23.1 | 2.2 |
| PFA10 | 2 | | severe delamination |

Compared with standard material, the PFA mixture of Example 6 shows markedly better flowability with the same degradation and a lower tendency to delaminate when lower temperatures and higher injection rates are used.

EXAMPLE 8

The PFA mixture of Example 6 is converted into melt pellets which show an MFI of 11. 1.5 kg of this mixture is melted in the melt container in a convection heating cabinet at 370° C. for 5 h, and injection molded within a period of 4 min into a mold, likewise heated to 370° C. and having complicated injection geometry. The shape to be encapsulated is that of a magnetic coupling. After cooling for 30 min with water, the molded specimen has no defects, in particular neither gas inclusions nor any discoloration. The MFI of the molding is 11.3. In contrast, a standard PFA with MFI 10 or 15 showed delaminations in the molding, making the component unusable.

EXAMPLE 9

125 kg of PFA mixture from Example 6 are placed in a 300 l tumbler dryer. During heating to 220° C., atmospheric oxygen and moisture are removed by alternate evacuation and flushing with nitrogen. The reactor is then filled with an $F_2/N_2$ mixture containing 10% of $F_2$. The reaction proceeds for 5 hours, and after each hour the $F_2/N_2$ mixture is renewed. During cooling from 220° C. to room temperature, unreacted fluorine in removed by alternate evacuation and flushing with $N_2$. The resultant product has only about 15 remaining COOH end groups, corresponding to about 10% of the thermally unstable end groups initially present.

The resultant product was injection molded essentially as described in Example 7. It is apparent during this that the postfluorinated PFA mixture of Example 9 can withstand higher thermal stresses.

| Dumbbell specimens: | DIN 53455, Test specimen No. 3 |
|---|---|
| Heating: | |
| Temperature in Zone 1: | $x_1$ |
| Temperature in Zone 2: | $x_2$ |
| Temperature in Zone 3: | 420° C. |
| Temperature in Zone 4: | 350° C. |

| Temperature [° C.] | | Material from | |
|---|---|---|---|
| Zone $x_1$ | Zone $x_2$ | Example 6 | Example 9 |
| 390 | 390 | colorless | colorless |
| 400 | 400 | colorless | colorless |
| 410 | 410 | yellowish | colorless |
| 420 | 420 | brownish | colorless |
| 430 | 430 | brown | colorless |
| 440 | 440 | brown | colorless |
| 450 | 450 | deep brown | colorless |

EXAMPLE 10

The procedure (i.e. the preparation of the polymerization reactor) the polymerization conditions, and the work-up) of Example 1 is followed. However, for preparing a novel mixture by step polymerization, at the start of the polymerization 7 g of methylene chloride and 2 g of APS are added. Following 50% of the amount of TFE to be run in, 35 g of methylene chloride and 10 g of APS are metered in. This gives a bipolymer having a PPVE content of 3.9% and an MFI of 2.1.

The first part of the polymerization gives a PFA having an MFI of 0.3. The MFI created in the second step is calculated from the MFI of 2.1 of the end product via the following equation:

$$MFI_A = \left( \frac{MFI_{End}^{-0.294} - x \cdot MFI_B^{-0.294}}{x} \right)$$

$x$ = proportion by weight

The MFI is therefore 75. The ratio of $MFI_A$ to $MFI_B$ is 250.

The PFA mixture of the invention created in this step polymerization was compared with a standard material PFA2 in a high-pressure capillary rheometer, in relation to the shear rate at which melt fracture occurs.

Compared with the commercially available material PFA2, the shear rate at which melt fracture just becomes visible is increased by a factor of 2 in the material of Example 10.

| | Shear rate at start of melt fracture in $s^{-1}$ |
|---|---|
| PFA2 | 15 |
| Example 10 | 30 |

EXAMPLE 11

The procedure (i.e., the preparation of the polymerization reactor, the polymerization conditions, and the work-up) of Example 1 is followed. However, for preparing a novel mixture by step polymerization, at the start of the polymerization 3 g of methylene chloride and 2 g of APS are added. Following the addition of 30% of the amount of TFE to be run in, 100 g of methylene chloride and 10 g of APS are metered in. This gives a bipolymer having a PPVE content of 3.9% and an MFI of 2.6, and a swell index of 1.54. The swell index is defined by the following formula: [DE/DD−1]100, where DE is the diameter of the extrudate and DD the diameter of the die.

The first part of the polymerization gives a PFA having an MFI of 0.1. An MFI of 130 created in the second stage is calculated from the MFI of 2.6 of the end product, using the equation given in Example 10. The ratio of $MFI_A$ to $MFI_B$ is 1300.

The material was processed on a continuous extrusion blow molding plant to give 1 l volumetric flasks and compared with a commercially available product having MFI=2 and a swell index of 1.1. High swell indices are particularly advantageous for this processing technology.

| The processing conditions are as follows: | |
| --- | --- |
| Melt temperature: | 370° C. |
| Extrusion speed: | 100 mm/min |
| Tube diameter: | 60 mm |
| Maximum blow-up ratio: | 2.5:1 |

Using the novel material, in contrast to the commercially available product, it was possible continuously to produce, without scrap, 1 l volumetric flasks with uniform wall thickness and wall thickness distribution. Using the commercially available product, this is successful only with volumetric flasks having a volume of up to 100 ml.

What is claimed is:

1. A shaped article comprising a mixture of thermoplastic PFA fluoropolymers consisting essentially of units of tetrafluoroethylene, from 0.5 to 10 mol % of units of one or more perfluoro alkyl vinyl ethers having from 1 to 4 carbon atoms in the perfluoroalkyl radical and up to about 5 mol % of other fluoromonomers not containing hydrogen, the mixture comprising:

at least 10% by weight of the mixture and not more than 90% by weight of the mixture of at least one component A) with a melt flow index $(MFI_A) \geq 30$ g/10 min. and not more than 90% by weight of the mixture and at least 10% by weight of the mixture of at least one component B) with a melt flow index $(MFI_B) \leq 15$ g/10 min., the components being selected in such a way that the ratio of $MFI_A$ to $MFI_B$ is in the range from 80 to 2500.

2. A shaped article according to claim 1 comprising a film, a pellet, wire insulation, cable insulation, a tube, a pipe, a container, and a vessel liner.

3. A process for making a shaped article comprising i) providing a mixture of thermoplastic PFA fluoropolymers consisting essentially of units of tetrafluoroethylene, from 0.5 to 10 mol % of units of one or more perfluoro alkyl vinyl ethers having from 1 to 4 carbon atoms in the perfluoroalkyl radical and up to about 5 mol % of other fluoromonomers not containing hydrogen, the mixture comprising:

at least 10% by weight of the mixture and not more than 90% by weight of the mixture of at least one component A) with a melt flow index $(MFI_A) \geq 30$ g/10 min. and not more than 90% by weight of the mixture and at least 10% by weight of the mixture of at least one component B) with a melt flow index $(MFI_B) \leq 15$ g/10 min., the components being selected in such a way that the ratio of $MFI_A$ to $MFI_B$ is in the range from 80 to 2500; and ii) forming a desired shape from the mixture.

4. A process according to claim 3 wherein the article is formed by extrusion, compression molding or injection molding.

* * * * *